United States Patent [19]
Agrawal et al.

[11] Patent Number: 6,075,777
[45] Date of Patent: Jun. 13, 2000

[54] NETWORK FLOW FRAMEWORK FOR ONLINE DYNAMIC CHANNEL ALLOCATION

[75] Inventors: Prathima Agrawal; Balakrishnan Narendran, both of New Providence, N.J.; Narayanan Shivakumar, Stanford, Calif.

[73] Assignee: Lucent Technologies Inc., Murray Hill, N.J.

[21] Appl. No.: 08/697,159

[22] Filed: Aug. 21, 1996

[51] Int. Cl.$^7$ ........................................... H04J 1/16
[52] U.S. Cl. ................................ 370/329; 370/437
[58] Field of Search ..................... 455/452, 445, 455/436, 450; 379/221; 370/329, 238, 437, 264, 439, 524, 351, 239, 400, 331

[56] References Cited

U.S. PATENT DOCUMENTS

| | | |
|---|---|---|
| 4,961,186 | 10/1990 | Chandramouli ........................ 370/264 |
| 5,218,630 | 6/1993 | Patsiokas ................................ 455/450 |
| 5,280,630 | 1/1994 | Wang ...................................... 455/452 |
| 5,481,604 | 1/1996 | Minot ...................................... 379/221 |
| 5,590,126 | 12/1996 | Mishra et al. . |
| 5,652,751 | 7/1997 | Sharony .................................. 455/445 |
| 5,654,958 | 8/1997 | Natarajan .............................. 455/445 |
| 5,732,351 | 3/1998 | Olds et al. ............................. 455/436 |
| 5,754,543 | 5/1998 | Seld ....................................... 370/351 |

*Primary Examiner*—Douglas W. Olms
*Assistant Examiner*—Kenneth Vanderpuye
*Attorney, Agent, or Firm*—Morgan & Finnegan, L.L.P.

[57] ABSTRACT

The invention relates to a dynamic channel allocation system for a mobile communication system wherein mobile units communicate with the base station on allotted channels. The channel allocations are determined according to a framework of network flows including flow paths with nodes representing active mobile units, base stations and channels used for communication between active mobile units and their respective base stations. A new call from a mobile unit is added by finding the shortest available augmenting path for the added unit. The edges between nodes can include cost and capacity factors which can be used to determine desirable reconfigurations for the network.

12 Claims, 5 Drawing Sheets

NETWORK FLOW FRAMEWORK FOR ONLINE DYNAMIC CHANNEL ALLOCATION

FIELD OF THE INVENTION

This invention relates to a framework based on network flows for Dynamic Channel Allocation (DCA) in a mobile telephone system.

BACKGROUND OF THE INVENTION

With increasing loads on mobile radio communication systems, the efficient utilization of the limited radio bandwidth becomes increasingly important. Frequency reuse over spatially separated areas has become a common technique used to increase system capacity. Fixed Channel Allocation (FCA) systems, where each cell is statically assigned a fixed set of frequencies (or channels) that are non-interfering with neighboring sets, do not often utilize the available capacity. This is particularly true when the load across cells is uneven. Dynamic Channel Allocation (DCA) strategies, on the other hand, are more flexible and allow every cell to use any of the global pool of channels, subject to the current state of the changing interference constraints.

In Dynamic Channel Allocation systems that provide increased capacity over FCA, the system has to decide (1) what channel to allocate to a new call, and (2) what reconfigurations are to be performed to the current channel allocations whenever a call completes or whenever the mobiles move. The former is referred to as call admission and the latter as reconfiguration.

Several different algorithms for dynamic channel allocation have been proposed in the literature. At one extreme are the optimal packing schemes that, for each given configuration, determine the best possible way of accommodating all the ongoing calls using as few channels as possible. Such algorithms achieve optimum capacity by definition, but do so at the cost of a complexity and expense that prohibits practical implementation. Furthermore, the channel allocation for each configuration of the mobiles is computed anew as the configurations change with time. Each new optimal allocation is likely to bear little resemblance to the prior allocation. This may result in a large number of calls being reassigned to different channels. The cost of constantly reassigning in a real system may be considerable. Also, there may be no feasible way for the system to "migrate" from one allocation to the next short of requiring all calls to switch to a new channel in a synchronized fashion.

The problems with optimal packing schemes have motivated a number of simplistic dynamic channel allocation systems. The simplest of these handles a call admission by having the new call acquire a channel that is not being used in "its vicinity", if such a channel exists. Otherwise, the call is blocked. A somewhat more aggressive algorithm also allows a new call to acquire a channel by displacing a nearby interferer, but only if the displaced call is able to acquire another channel not used in its vicinity to thereby restrict the ripple effect of channel reassignments. Most of these systems deal only with call admissions, and do not consider channel reassignments at call terminations or due to mobility. Channel reassignments required due to a handoff from one cell to another are treated as a call termination in one cell and as a new call in another. Some variants of the scheme specify an ordering of the channels to be tried in sequence. Such ordered schemes perform channel reassignments at call terminations by requiring that the active calls in a cell use the topmost available channels according to the channel ordering for the cell. The attractive simplicity of such schemes comes from enforcing hard constraints on the number of possible reassignments. Even when a few extra reassignments may result in a much improved allocation, the algorithms may forbid such a reassignment. Furthermore, the possibility of exploiting potentially improved reassignments when calls terminate or mobiles move are not explored by these algorithms.

SUMMARY OF THE INVENTION

The invention is based on a new framework for determining dynamic channel assignment based on network flows. The invention addresses the disadvantages of the optimal packing schemes, while at the same time bridging the gap relative to the simple schemes. In particular, the cost of performing the reassignments is traded off with the benefit of moving to the new assignment. This framework not only admits the channel assignments generated by prior systems, but also permits other assignments if their reassignment cost is not too high. In contrast to the arbitrary reassignments generated by optimal packing, the reassignments generated according to the invention have a structure that suggests a way to implement the reassignment in practice.

In addition, the framework according to the invention allows incorporation of many novel features in a natural fashion. An example is the consideration of the "quality" of the overall assignment as some function of the quality of the various individual connections. Most DCA algorithms are insensitive to quality considerations, and usually pick an arbitrary feasible assignment. In cases where the algorithm does depend on the quality of the connections, it only handles new call admission decisions meaning that the algorithm is forced to be pessimistic. In other words, to minimally impact future call arrivals, a new call is forced to acquire the available channel that is of the least quality acceptable to its demands. With the framework according to the invention, a new call initially gets the best possible channel and gives it up for a poorer channel only if later arrivals require such degradation. The system is also capable of handling capacity restrictions on base stations, minimum SNR requirements of mobiles etc.

The system according to the invention creates a network flow framework with nodes for each mobile unit, each base station and each frequency or channel in use between a mobile unit and a base station. The edges between nodes include capacity and cost factors. When a new mobile is to be added, a node is added for the mobile together with all available paths through frequency nodes and base station nodes. Augmenting paths for the new mobile which require shifting previous frequencies or base stations are included. A shortest path algorithm is used to select the lowest cost (shortest) path for the new mobile if one exists below threshold value. Optionally, noise or other quality factors for the paths from mobiles to base station can be included in the cost calculations for the available paths to determine the best path available. Since cost and quality factors are included in the path evaluations, the system can be used to evaluate network reconfigurations.

BRIEF DESCRIPTIONS OF THE DRAWINGS

The preferred embodiments are described in the following specification which includes the following drawings wherein.

DETAILED DESCRIPTION OF THE PREFERRED EMBODIMENTS

Reuse and Interference Models

Figure 1:
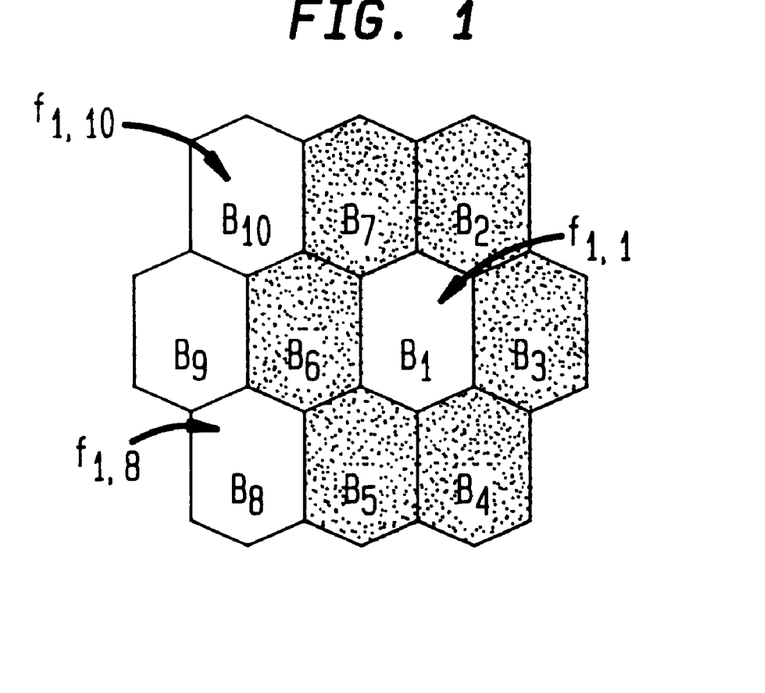
FIG. 1 is a diagram illustrating a cell-based, channel reuse model.

The invention will be described according to two different network flow frameworks based on different channel reuse models. The first of these is the cell based reuse model traditionally employed in FDMA based fixed channel allocation as illustrated in FIG. 1. In the cell based reuse model, the channel reuse criteria is based on the neighborhood of the cells. In other words, each cell has a pre-defined set of neighboring cells, and a channel in use in a particular cell may not be reused in aeny of the cell's neighbors. Cell $B_1$ is surrounded by neighboring cells $B_2$ through $B_7$. If frequency one (designated $f_{1,1}$ when used with base station $B_1$) is used in cell 1, the same frequency cannot be used in any of the neighboring cells, but can be used in more remote cells such as $f_{1,8}$ in cell $B_8$ and $f_{1,10}$, in cell $B_{10}$.

Figure 2:
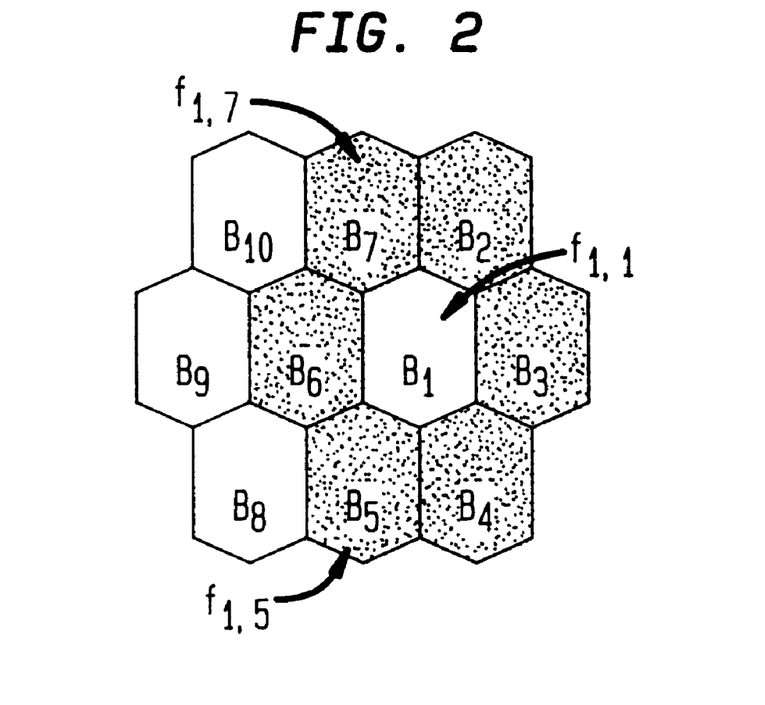
FIG. 2 is a diagram illustrating a more permissive reuse model based on communication quality.

The second reuse model, as illustrated in FIG. 2, is more permissive and permits use of any channel if, and only if, the measured noise values between two uses of a channel do not exceed a certain threshold. With the later reuse model, interference is decided dynamically based on current conditions. Cells $B_7$ and $B_5$, neighbors of cell $B_1$, may use the same channel or frequency one ($f_{1,1}$, $f_{1,7}$ and $f_{1,8}$) and still not interfere if, for example, they are on opposite extreme ends of their respective cells.

In either case, the reuse model being used provides the following basic data: for each pair of ongoing calls, the reuse model determines if they would interfere by using the same channel. In addition, the reuse model may provide other information depending on the particular metric(s)/cost(s) being used within the general framework. For example, a cost metric may be used to determine channel allocation based on the quality of the current assignment. For this purpose, the reuse model can be used to provide information about the noise or crosstalk that a new connection is likely to experience with respect to other uses of the same channel.

The stricter cell-based reuse conditions limit the ability to make dynamic channel allocations. For example, an intra-cell displacement, where a call arrival at a particular cell displaces another call in the same cell, can never occur with cell-based reuse conditions. To fully exploit the channel allocating capability of the system according to the invention, interference-based reuse conditions should be used.

The Network Flow Framework

Figure 3:
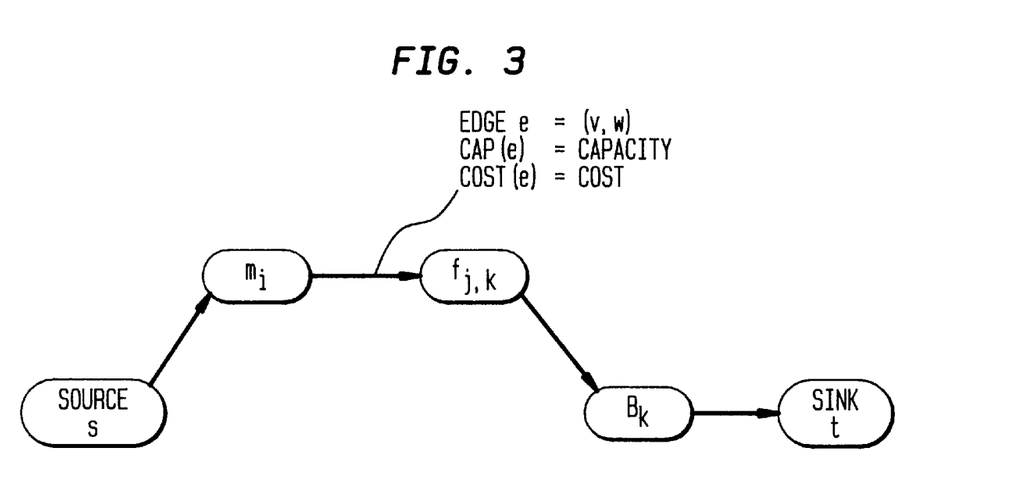
FIG. 3 is a diagram illustrating a flow path of a flow framework according to the invention.

The network flow framework for dynamic channel allocation according to the invention is illustrated in FIG. 3. The terms used in the following sections are taken from standard network flow terminology found, for example, in R. K. Ahuja, T. L. Magnanti, J. B. Orlin *Network Flows: Theory, Algorithms and Applications*. Prentice-Hall, N.J., 1993.

A flow network F is a directed graph G(V,E), where V contains two distinguished nodes—a source node s and a sink node t. Each edge e=(v,w) in the graph has an associated integer capacity cap(e), and a cost(e). The costs satisfy the constraint that the cost of an edge in one direction is the negative of its cost in the reverse direction, i.e, cost(v,w)=−cost(w,v). A flow f on a source node is a specified node from which a path flows. A sink node is a specified node to which a path flows. An edge is an arc and has two endpoints. a flow network F=G(V,E) is a function on the edges of F such that the flow on each edge is at most its capacity (f(v,w)≦cap(v,w)), where the flow in one direction is treated as negative flow in the reverse direction f(v,w)=−f(w,v) and for every node v (except s or t), the flow into/out of v is conserved $\Sigma_w f(v,w)=0$). The total flow is defined as the flow out of the source s or, equivalently, the flow into the sink t. The total cost of the flow is defined to be the weighted sum $\Sigma_e f(e)$ cost(e).

The flow framework used for determining channel allocation according to the invention, can be considered an operational snapshot of the cellular system (i.e. mobile configurations, base station and frequency assignments) at an arbitrary point in time t. The configuration at time t is captured by a corresponding flow network $F^t$ and a flow $f^t$ on it. The network and flow are modified at certain trigger points, which correspond to call arrivals, terminations, handoffs, etc. The flow network and the flow on it (and consequently the channel assignment determined by the flow network) are changed only at the trigger points. Costs on the flow network's edges can change in a more continuous manner, since they represent the changing quality due to mobility or other reasons.

Figure 4:
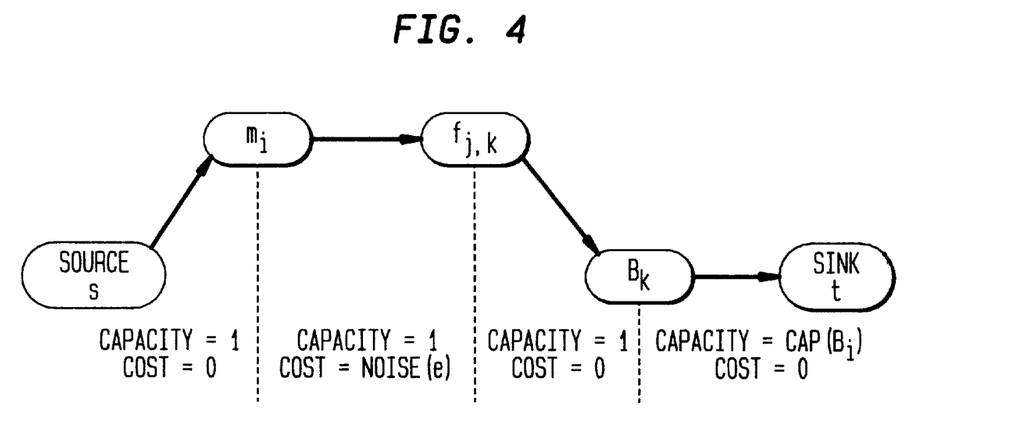
FIG. 4 is a diagram illustrating a flow path with capacity and cost associated with edges thereof.

The structure of $F^t$ and $f^t$ is now defined for the configuration of the system at time t. Noise($m^i, f^{jk}$) defined to be the noise that mobile i would see on a communication to a base station k on frequency j, assuming the applicable reuse constraints are satisfied. In addition to s and t, the network $F^t$ contains the following nodes (see FIG. 3): a node $m_i$ corresponding to each active mobile i in the system ($1 \leq i \leq B$), and a node $B_k$ corresponding to each base station (or cell) k in the system ($1 \leq k \leq B$), and a node $f_{jk}$, for each frequency j supported at base station k. The edges of $F^t$ are illustrated in FIG. 4. For each mobile i, add an edge from s to $m_i$, of capacity 1 and cost 0. For each base station k, add an edge from $B_k$, to t of cost 0 and capacity equal to the capacity of k (the number of mobiles it can support at any time). Assign the edge ($f_{jk}, B_k$) a capacity of 1, and a cost of 0.

The last class of edges in FIG. 4 go between the mobile nodes and the frequency nodese, For each mobile i, and frequency j such that mobile i can potentially talk to base station k on frequency j, add at most one edge e, where e is given by $$e = \begin{cases} (m_i, f_{jk}), & \text{if } i \text{ is free to use } j \text{ to talk to } k, \\ (m_i, f_{jl}), & \text{if there is at most one interferer on} \\ & \text{frequency } j, \text{ talking to base station } l. \end{cases}$$

For each such edge e assign a capacity 1 and a cost equal to Noise(e).

Finally, the costs are adjusted to represent the penalties for reassignments. Let β denote the parameter representing the cost of an intercell reassignment, where a call is reassigned to another base station. Let α denote the cost of an intra-cell reassignment, where a call is reassigned to another frequency in the same cell. For each frequency j being used in cell k, subtract $\beta$ from the cost of $(f_{jk}, B_k)$. For each mobile i currently assigned to base station k on frequency j, subtract $\alpha$ from the cost of $(m_i, f_{jk})$.

Figure 5:
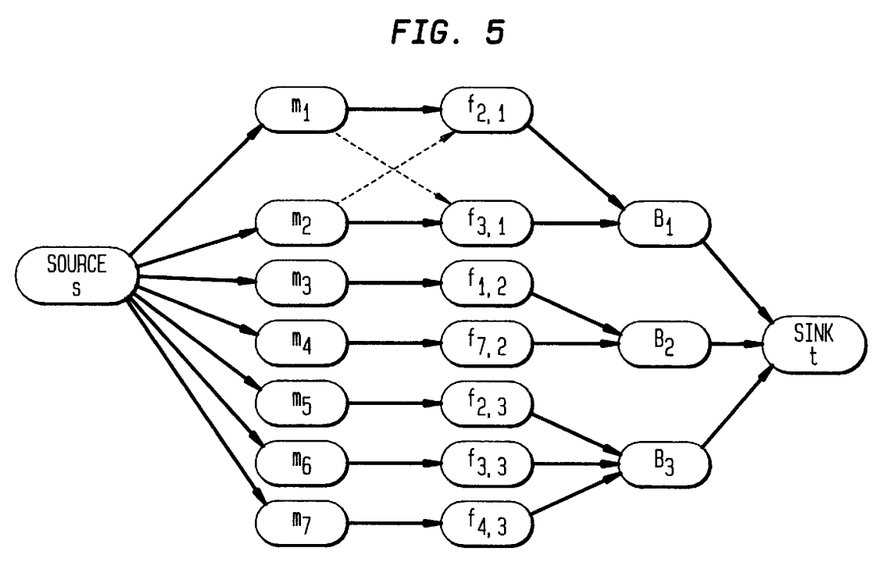
FIG. 5 is a network flow diagram according to the invention.

FIG. 5 illustrates a flow network $F^t$ with multiple flow paths. Mobiles $m_1$ and $m_2$ communicate with base station $B_1$ using channel 2 ($f_{2,1}$) and channel 3 ($f_{3,1}$) respectively. As indicated by the dotted line flow paths mobile $m_1$ can potentially communicate with base station $B_1$, using channel 3 ($f_{3,1}$) and mobile m2 can potentially communicate with the base station using channel 2 ($f_{2,1}$). Mobiles $m_3$ and $m_4$ are shown to communicate with base station $B_2$ via channel 1 ($f_{1,2}$) and channel 7 ($f_{7,2}$). Additional potential channels (not shown in FIG. 5) can also be used for mobiles $m_3$ and $m_4$. Mobiles $m_5$, $m_6$, and $m_7$ communicate with base station $B_3$ via channels 2, 3 and 4 ($f_{2,3}$, $f_{3,3}$ and $f^{4,3}$) respectively. Other potential channels also exist in a complete system, but, for simplicity, are not shown in FIG. 5.

Although $F^t$ can become a fairly complex graph in an actual system, the changes in $F^t$ caused by the various triggers described later are very local in nature, and easy to compute. Thus, from an operational point of view, manipulating $F^t$ does not pose a serious problem.

Lastly, $f^t$, the flow on $F^t$, is defined by the actual channel assignment at time t in a natural fashion—an assignment of mobile i to frequency j and base station k corresponds to a unit flow through the path $$s \to m_i \to f_{jk} \to B_k \to t.$$

Given a flow network F and a flow f on it, a residual graph R of F with respect to f is a flow network with the same cost structure as F, and the following capacities: If edge (v,w) had capacity c(v,w) in F and flow f(v,w), then the capacities with respect to R are given by $cap_R(v,w)=c(v,w)-f(v,w)$ and $cap_R(w,v)=f(v,w)$. Intuitively, the capacities in R denote the unutilized capacities of F as well as the possibility of pushing back the flow f. The general strategy for dynamic channel allocation according to the invention is to compute channel reassignments by finding paths in the residual graph through which new flow can be pushed. The new flow will either increase the total flow from s to t (admitting a new mobile into the system) or reroute flow internally along a negative cost cycle (improving the current assignment).

New Call Admission

The first "trigger" event to consider is the arrival of a connection request from a new mobile. In this case, the goal is to admit the new mobile, if possible, incurring as little added cost as possible. This is done by first expanding the current flow graph $F^t$ to include the new mobile and by then find an augmenting path (a path with residual capacity) in the residual graph from s to t that goes through the new mobile.

Figure 6:
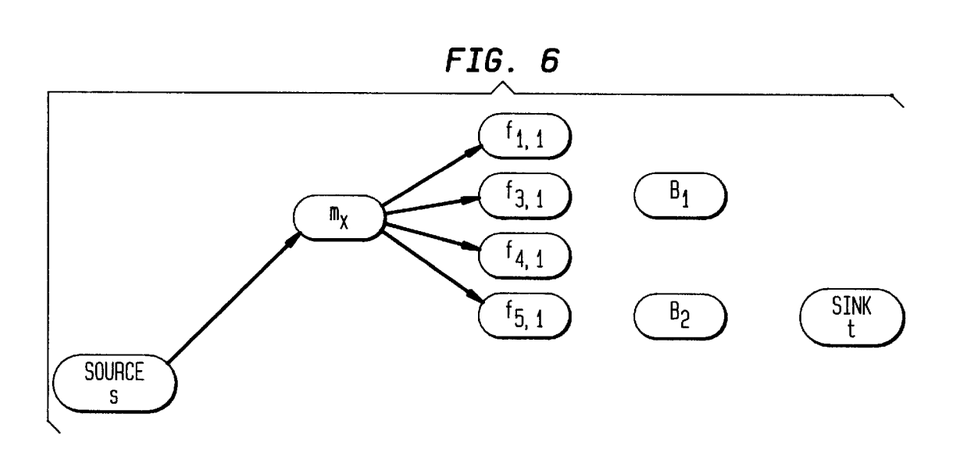
FIG. 6 is a partial network flow diagram illustrating added nodes and edges seeking augmenting paths for addition of a new mobile.
Figure 7A:
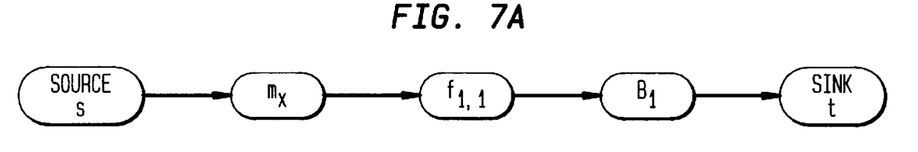
FIG. 7 illustrates several possible augmenting flow paths.
Figure 7B:
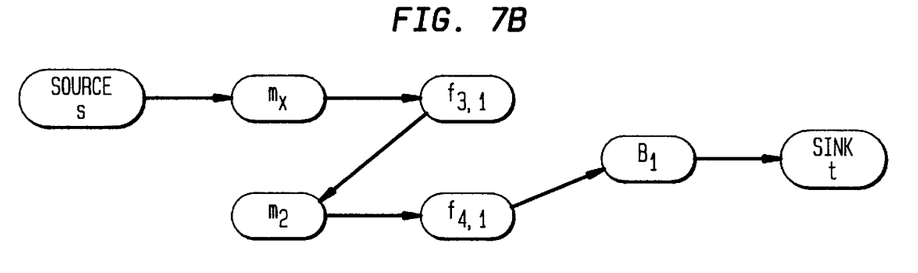
Figure 7C:
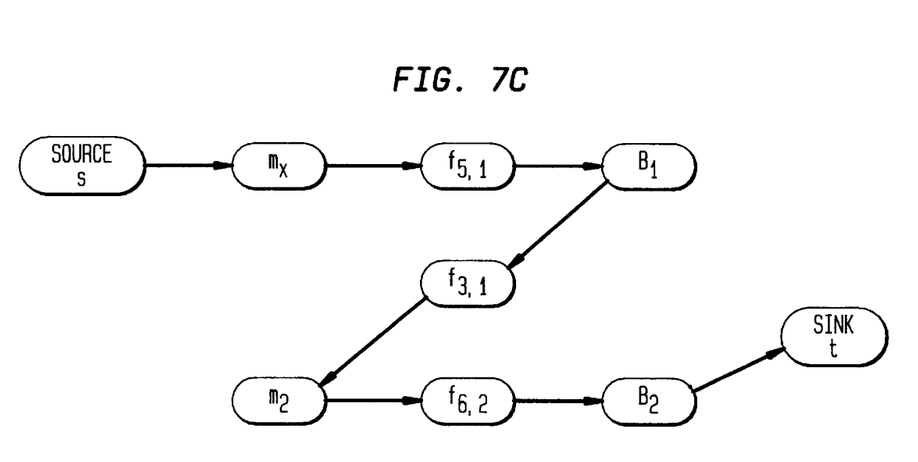

FIG. 6 illustrates a few of the additions to the existing network (FIG. 5) as the initial steps in the search for augmenting paths. Let $m_x$ be the new node added to $F^t$ reflecting the new mobile. A single edge from s to $m_x$ of capacity 1 and cost 0 is then added. Next, edges from $m_x$ to the appropriate frequency nodes $f_{jk}$ are added as described in the construction of $F^t$ (FIG. 5) above. A shortest path algorithm is then used to compute a minimum cost augmenting path p from s to t that goes through $m_x$. If no such path exists, the new call is declared blocked. On the other hand, if an augmenting path from s to t exists, it provides, when traversed in reverse, a sequence of realizable reassignments that results in a feasible assignment that satisfies reuse constraints. The cost of the augmenting path equals the sum total improvement or deterioration in the overall assignment as well as the cost of the reassignments (as determined by the user specified cost parameters). Conversely, if no such augmenting path exists, then there exists no possible single-chain reaction of reassignments that would have admitted the call. FIG. 7 illustrates four examples of possible augmenting paths. FIG. 7(A) illustrates a simple assignment where the added mobile mex is assigned to communicate with base station $B_1$ on frequency $f_{1,1}$. Assume that channel $f_{1,1}$ to base station $B_1$ does not interfere with channel $f_{1,2}$ to base station $B_2$. In this example, the channel is available and no channel reassignment is required. In FIG. 7(B) a reassignment within the same cell occurs. New mobile $m_x$ acquires frequency $f_{3,1}$ and displaces mobile $m_2$, which in turn acquires frequency $f_{4,1}$. FIG. 7(C) shows a more elaborate set of reassignments that involves a call from mobile $m_2$ being switched from a saturated base station $B_1$ to a different, neighboring base station $B_2$.

Reconfigurations

Reconfigurations of channel assignments may be performed at trigger events other than call arrivals. Examples of such events are call terminations, handoffs, or deterioration of signal quality on one or more links (due to mobility or other reasons). Of these, perhaps a handoff is the only event that requires a reconfiguration for continued feasibility of the channel assignment. Most dynamic channel allocation algorithms of the past treat handoffs as two distinct events—a call termination in one cell followed by a new call arrival in a neighboring cell. With the approach according to the invention all of the events for a handoff are under a common framework since a change in quality of a communication trigger is a reconfiguration. A handoff is considered an extreme case of quality deterioration requiring a reconfiguration. In the case of call terminations, a potential exists for an improved set of channel assignments that may become possible because of resources freed by the departing call.

Preferably, channel qualities, particularity noise, is subject to continuous monitoring and is periodically reflected in the costs of the edges of the flow graph. In addition, mobility may also cause occasional structural changes in the graph as mobiles move closer to or further from base stations, interferers, etc. The trigger events for such reconfigurations could be defined as either a degradation of quality beyond some threshold or the completion of some threshold number of call terminations.

Unlike the case of call arrivals, the maximum flow possible through the flow graph does not increase due to reconfiguration changes. However, the cost of the current flow (and the cost of the best possible flow) keeps changing due to the changes in the edges and edge costs. The following lemma is from standard network flow theory:

Lemma 1 Let f be a (sub-optimal) flow in a network, and f' the minimum cost flow. Then, the flow f*–f can be decomposed into a set of cyclic flows along negative cost cycles.

Figure 8:
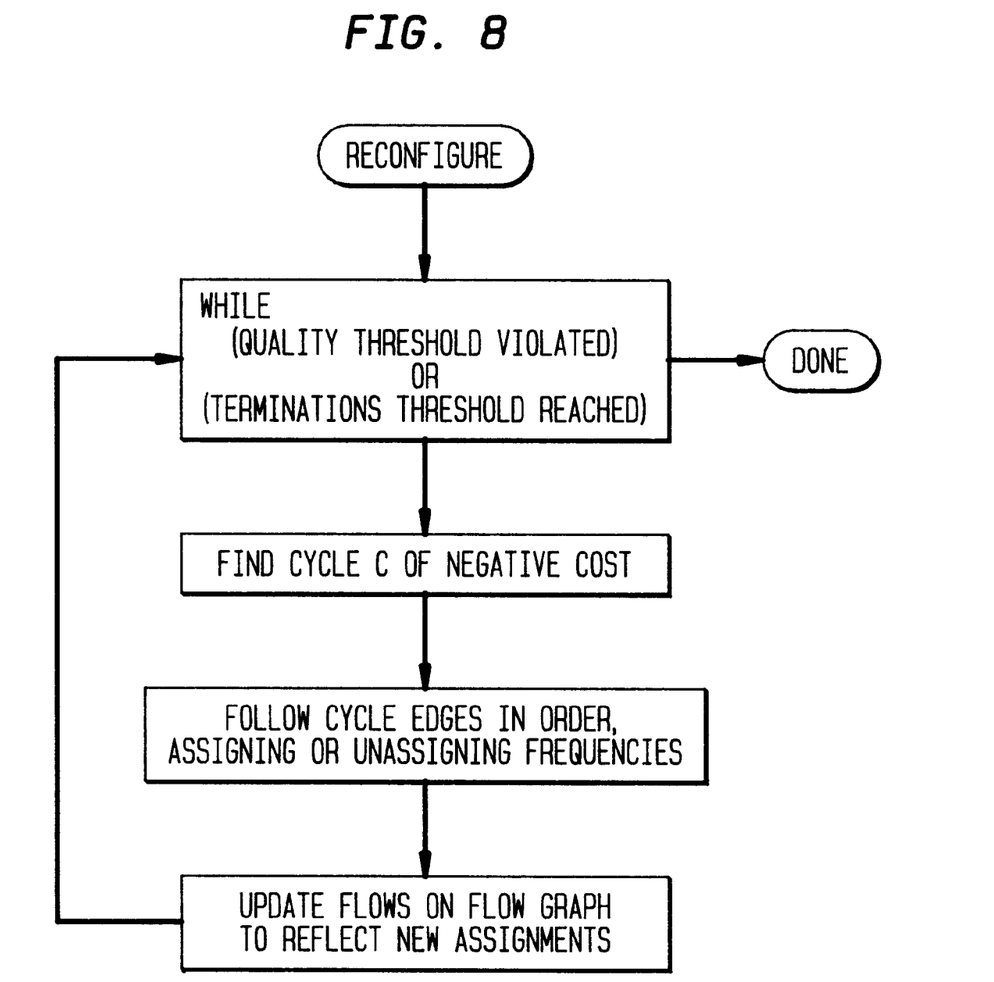
FIG. 8 is a flow diagram for the reconfiguration algorithm.

Thus, the migration from f to the optimal flow f*, is achieved by finding negative cost cycles in the residual graph of the current flow. Such negative cost cycles, are "cancelled" by pushing flow through it. Physically, this corresponds to making the reassignments along the paths of the cycle, just as in the case of the augmenting paths previously described. FIG. 8 presents a high level pseudocode for Procedure reconfigure. In this procedure, while the quality threshold is violated or the termination threshold is reached, the program repetitively cycles through the steps (1) search for a cycle C of negative cost, (2) follow cycle edges in order, assigning and unassigning frequencies, and (3) update the flows on the flow graph to reflect new assignments.

There may be more than one negative cost cycle in a residual graph. One option is to find these in some arbitrary order. A shortest path algorithm can be used to find neegative cost cycles. However, it may be desirable to find the negative cost cycle whose cancelling gives the maximum benefit. Unfortunately, finding the cycle with the most negative cost is NP-Complete. However, there exist polynomial time algorithms to compute the cycle with the minimum mean cost (i.e. cost of cycle/length of cycle) [A. V.Goldberg and R. E. Targan *Finding Minimum Cost Circulations by Cancelling Negative Cycles*, Journal of the ACM, 36(4): 873–866, 1989]. In combination with the following Lemma 2, which suggests that the number of reassignments involved in any cycle is roughly proportional to the length of the cycle, that the cycle that provides the "maximum gain per reassignment" can be found. Lemma 2 Let C be any negative cost cycle of length n. Then, the number of frequency switches by base stations and/or mobiles in the reconfigurations induced by C lies between $$\frac{n}{2} - 2$$

and $n/2$.

Preemptive Channel Allocations

The previous sections have always assumed non- preemptive assignments, where a call in progress is never dropped unless it does not have the resources to continue. Another scenario could be where a call in progress may be dropped if the resultant freeing of resources can result in a new configuration that is globally superior in quality. Another variation is where new calls that were unable to get resources are allowed to wait in the system to be assigned a channel at a later time. The framework according to the invention can be extended to handle such scenarios; and variants of the algorithms described above can be designed to operate for such situations.

Conclusion

This invention presents a new framework, based on network flows, capable of performing on-line dynamic channel assignment in cellular networks. It provides a graceful tradeoff between capacity maximization and the penalties associated with channel reassignment. In addition, the invention provides for optimizing the overall quality of an assignment according to a cost metric that is quite general and can be parameterized for various purposes. The framework handles channel reassignments for new call admissions as well as call terminations, handoffs, and channel degradations in a uniform manner. There are many variations within the scope of this invention which is more particularly defined in the appended claims.

We claim:

1. A method for dynamic channel allocation in a mobile communication system wherein mobile units communicate with base stations on allotted channels to form a network, including the steps of:

creating a framework for network flows including flow paths, augmenting flow paths and reverse flow paths between a plurality of active mobile unit nodes corresponding to a plurality of mobile units, a plurality of base station nodes corresponding to a plurality of base stations, and a plurality of frequency channels used between active mobile unit nodes and their respective base station nodes;

admitting a new call from a mobile unit being added by finding a plurality of augmenting flow paths in said framework, each of said plurality of augmenting flow paths passing through an added mobile unit node for said mobile unit being added, a base station node corresponding to an available base station, and at least one channel available for communicating between said added mobile unit and said available base station;

said plurality of augmenting flow path including reverse flow paths corresponding to reassignments of said channels or base stations; and allocating a channel to said new mobile unit being added according to a shortest of said plurality of augmenting flow paths through said added mobile unit node.

2. The method for dynamic channel allocation according to claim 1 including a quality factor in each flow path and wherein the flow path allocated for said added mobile unit is highest quality channel available.

3. The method for dynamic channel allocation according to claim 2 wherein said quality factor is determined according to noise between said channels.

4. The method for dynamic channel allocation according to claim 1 wherein cost factors are included in the flow paths and wherein the addition of a new mobile unit is blocked where an augmenting flow path of said plurality of augmenting flow paths below a predetermined cost threshold is not found.

5. The method for dynamic channel allocation according to claim 1 wherein an augmenting flow path that requires a channel reassignment includes a reverse flow path from the channel being reassigned to the mobile unit node having its channel reassigned.

6. The method for dynamic channel allocation according to claim 1 wherein an augmenting path of said plurality of augmenting flow paths that involves a base station reassignment includes a reverse flow path according to the base station reassignment and a reverse flow path according to the channel reassignment necessitated by the base station reassignment.

7. A method for dynamic channel allocation in a mobile communication system wherein mobile units communicate with base stations on allotted channels, including the steps of:

creating a framework for network flows based on a configuration of said mobile communication system at a specific time, the framework including flow paths, augmenting flow paths and reverse flow paths between a plurality of active mobile unit nodes corresponding to a plurality of mobile units, a plurality of base station nodes corresponding to a plurality of base stations, and a plurality of frequency channels assigned between active mobile unit nodes and their respective base station nodes:

each of said flow paths including cost factors, and reconfiguring said systems by reassigning said channels that result in flow path cost reductions, wherein said reconfiguring is triggered by an event.

8. The method for dynamic channel allocation according to claim 7 wherein said reconfiguration take place following call terminations.

9. The method for dynamic channel allocation according to claim 7 wherein said reconfiguration takes place following handoffs when a mobile unit is transferred to a different base station.

10. The method for dynamic channel allocation according to claim 7 wherein said reconfiguration takes place in response to signal quality deterioration.

11. The method for dynamic channel allocation according to claim 7 wherein said cost factors include interchannel noise.

12. A method for dynamic channel allocation in a mobile communication system wherein mobile units communicate with base stations in allotted channels, including the steps of:

creating a framework for network flows based on a configuration of said mobile communication system at a specific time, the framework including flowpaths between a plurality of active mobile unit nodes corresponding to a plurality of mobile units, a plurality of base station nodes corresponding to a plurality of base stations, and a plurality of frequency channels assigned between active mobile unit nodes and their respective base station nodes, each of said flow paths including cost factors;

and reconfiguring said system by reassigning said frequency channels and displacing the mobile unit nodes that result in flow paths cost reductions, wherein said reconfiguring is triggered by an event.

* * * * *